US009613465B1

(12) United States Patent
Tsai et al.

(10) Patent No.: US 9,613,465 B1
(45) Date of Patent: Apr. 4, 2017

(54) METHOD FOR SUTURING 3D COORDINATE INFORMATION AND THE DEVICE USING THE SAME

(71) Applicant: Industrial Technology Research Institute, Hsinchu (TW)

(72) Inventors: Ya-Hui Tsai, Taoyuan (TW); Wei-Yao Chiu, Chiayi (TW); Chin-Kuei Chang, Taipei (TW); Yu-Ting Lin, New Taipei (TW); Keng-Hao Chang, Taichung (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 14/977,513

(22) Filed: Dec. 21, 2015

(30) Foreign Application Priority Data

Dec. 14, 2015 (TW) .............................. 104141875 A

(51) Int. Cl.
G01B 11/24 (2006.01)
G06T 19/20 (2011.01)
(Continued)

(52) U.S. Cl.
CPC .............. *G06T 19/20* (2013.01); *G01B 11/22* (2013.01); *G01B 11/24* (2013.01); *G01B 11/303* (2013.01);
(Continued)

(58) Field of Classification Search
CPC . G01B 11/2504; G01B 11/24; G01B 11/2518; G01B 21/042; G01B 11/002;
(Continued)

(56) References Cited

U.S. PATENT DOCUMENTS

2010/0156896 A1* 6/2010 Ichimura .............. G01B 11/245
345/419
2012/0287247 A1 11/2012 Stenger et al.
(Continued)

FOREIGN PATENT DOCUMENTS

CN 101916457 B 11/2011
CN 104315995 A 1/2015
(Continued)

OTHER PUBLICATIONS

Liu et al. "A 3D Pointcloud Registration Algorithm Based on Fast Coherent Point Drift," Applied Imagery Pattern Recognition Workshop (AIPR), Oct. 2014, pp. 1-6, IEEE, US.
(Continued)

*Primary Examiner* — Michael P Stafira

(57) ABSTRACT

The present disclosure discloses a method for suturing 3D coordinate information. The method includes disposing a correction block on a test platform; capturing first 3D coordinate information represented by a first viewing angle and second 3D coordinate information represented by a second viewing angle from the correction block; determining a first center coordinate of the first 3D coordinate information and a second center coordinate of the second 3D coordinate information; superimposing the first 3D coordinate information to the second 3D coordinate information to form first overlap 3D coordinate information; suturing the first 3D coordinate information into the second 3D coordinate information to form a first 3D coordinate suturing result according to an iterative closet point algorithm; and determining a first transformation relation of the first viewing angle versus the second viewing angle according to the first 3D coordinate information and the first 3D coordinate suturing result.

14 Claims, 10 Drawing Sheets

(51) Int. Cl.
*G01B 11/30* (2006.01)
*G01B 11/22* (2006.01)
*G06T 7/00* (2017.01)

(52) U.S. Cl.
CPC .......... *G06T 7/0042* (2013.01); *G06T 7/0075* (2013.01); *G06T 2207/10028* (2013.01)

(58) Field of Classification Search
CPC ... G01B 11/245; G01B 11/03; G01B 11/2513; G01B 9/02072; G01B 9/0209; G01B 11/00; G01B 11/14; G01B 11/2441; G01B 11/25
See application file for complete search history.

(56) References Cited

U.S. PATENT DOCUMENTS

| | | | |
|---|---|---|---|
| 2013/0021449 A1* | 1/2013 | Tani | G01B 11/002 348/47 |
| 2014/0226167 A1 | 8/2014 | Smith et al. | |
| 2014/0267624 A1* | 9/2014 | Hara | G01B 11/2504 348/46 |
| 2015/0146215 A1* | 5/2015 | Kobayashi | G01B 11/2513 356/610 |
| 2015/0154806 A1 | 6/2015 | Ogale | |
| 2015/0190200 A1* | 7/2015 | Courtine | A61N 1/36003 604/20 |

FOREIGN PATENT DOCUMENTS

| | | |
|---|---|---|
| TW | I358606 | 2/2012 |
| TW | 201229962 A1 | 7/2012 |
| TW | 201445508 A | 12/2014 |
| TW | I475244 B | 3/2015 |
| TW | 201520973 A | 6/2015 |

OTHER PUBLICATIONS

Mellado et al., "Super 4PCS Fast Global Pointcloud Registration Via Smart Indexing," Computer Graphics Forum, Aug. 2014, pp. 205-215, vol. 33, No. 5, John Wiley & Sons Ltd., US.

Akca et al., "Simultaneous Co-Registration and Georeferencing of Multiple Pointclouds," 28th Asian Conference on Remote Sensing, Oct. 2009, 7 pages, ACRS, US.

Yan-ju et al. "A Parallel Fast Sort Algorithm for Mass 3D Point Clouds of Irregular Model," International Journal of Multimedia and Ubiquitous Engineering, Jun. 2015, pp. 17-24, vol. 10, No. 6, SERSC, US.

Jiang et al. "A Three-Dimensional Measuring System Based on 2D Laser Displacement Sensor," International Symposium on Sptoelectronic Technology and Application 2014, Dec. 2014, 6 pages, vol. 9297, SPIE, US.

Zhang et al., "Registration of Pointcloud and CAD Model Based on Extended Gaussian Sphere," Journal of Mechancal Engineering, Jun. 2007, pp. 142-148, vol. 43, No. 6, China Academic Journal Electronic Publishing House, China.

* cited by examiner

METHOD FOR SUTURING 3D COORDINATE INFORMATION AND THE DEVICE USING THE SAME

TECHNICAL FIELD

The disclosure relates to a 3D coordinate information suturing method, and more particularly to a 3D coordinate information suturing method of combining center coordinate information and edge weight features.

BACKGROUND

Before a suturing system sutures a three-dimensional (3D) artifact, the depth sensing unit needs to scan the morphology of the 3D artifact several times in succession, which can be time consuming issue. In view of this, the present disclosure provides a 3D coordinate information suturing method and a device using the same.

SUMMARY

An embodiment of the present disclosure provides a 3D coordinate information suturing method for applying on a 3D coordinate information suturing device. The 3D coordinate information suturing method comprises disposing a correction block on a test platform of the 3D coordinate information suturing device; capturing first 3D coordinate information represented by a first viewing angle and second 3D coordinate information represented by a second viewing angle by at least one depth sensing unit from the correction block; determining a first center coordinate of the first 3D coordinate information and a second center coordinate of the second 3D coordinate information; transforming the first center coordinate into the second center coordinate such that the first 3D coordinate information is superimposed onto the second 3D coordinate information to form first overlap 3D coordinate information; suturing the first 3D coordinate information into the second 3D coordinate information to form a first 3D coordinate suturing result according to an iterative closet point algorithm; and determining a first transformation relation of the first viewing angle versus the second viewing angle according to the first 3D coordinate information and the first 3D coordinate suturing result.

An embodiment of the present disclosure provides a 3D coordinate information suturing device. The 3D coordinate information suturing device comprises a test platform, at least one depth sensing unit, and a processing device. The test platform is used to dispose a correction block. The at least one depth sensing unit is used to respectively capturing first 3D coordinate information represented by a first viewing angle and second 3D coordinate information represented by a second viewing angle from the correction block. The processing device is connected to the at least one depth sensing unit and used to determine a first transformation relation of the first viewing angle versus the second viewing angle, wherein the processing device determines a first center coordinate of the first 3D coordinate information and a second center coordinate of the second 3D coordinate information; wherein the processing device transforms the first center coordinate into the second center coordinate such that the first 3D coordinate information is superimposed onto the second 3D coordinate information to form first overlap 3D coordinate information; wherein the processing device sutures the first 3D coordinate information into the second 3D coordinate information to form a first 3D coordinate suturing result according to an iterative closet point algorithm; and wherein the processing device determines the first transformation relation according to the first 3D coordinate information and the first 3D coordinate suturing result.

BRIEF DESCRIPTION OF THE DRAWINGS

The present disclosure can be more fully understood by reading the subsequent detailed description and examples with references made to the accompanying drawings, wherein.

DESCRIPTION OF THE EMBODIMENTS

The following description is of the best-contemplated mode of carrying out the present disclosure. This description is made for the purpose of illustrating the general principles of the present disclosure and should not be taken in a limiting sense. The scope of the present disclosure is best determined by reference to the appended claims.

Figure 1:
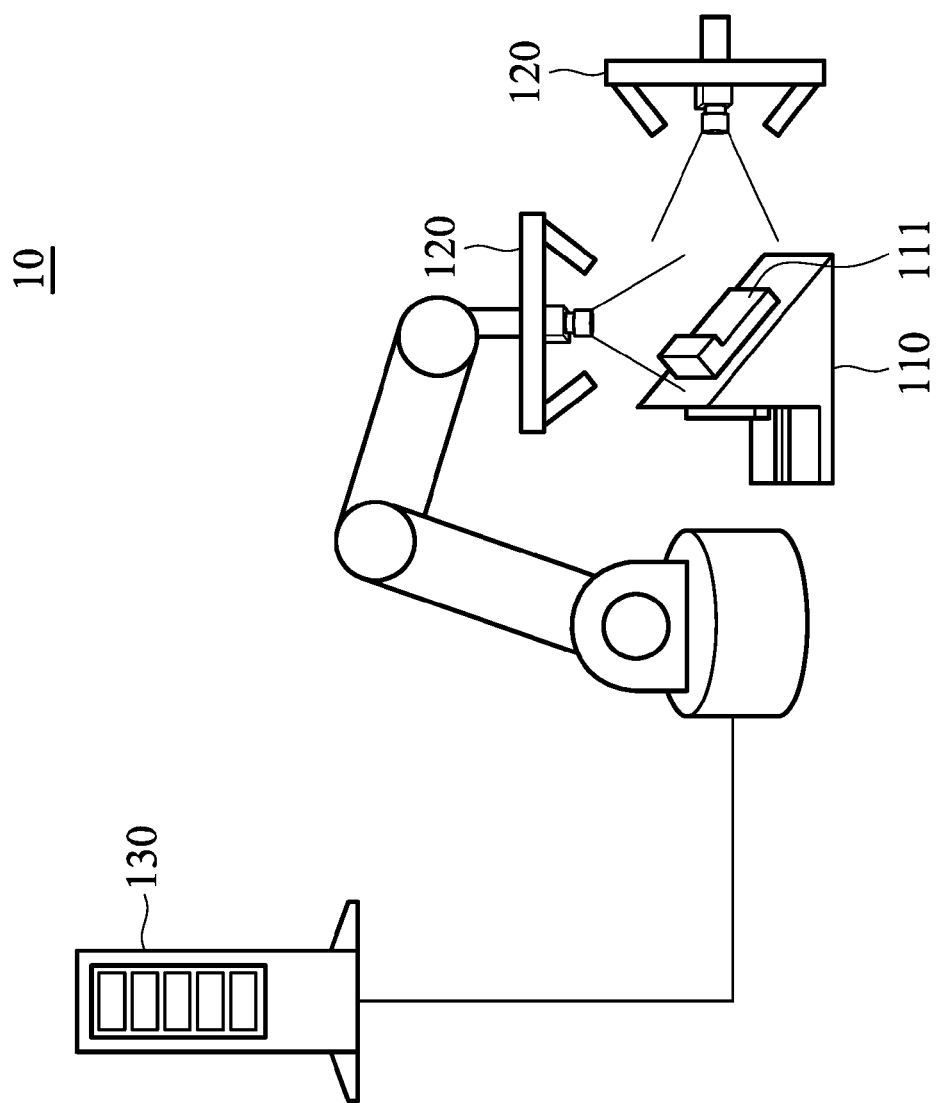
FIG. 1 shows a block diagram of a 3D coordinate information suturing device 10 according to a first embodiment of the present disclosure.

FIG. 1 shows a block diagram of a 3D coordinate information suturing device 10 according to a first embodiment of the present disclosure. In the first embodiment, the 3D coordinate information suturing device 10 comprises a test platform 110, at least one depth sensing unit 120, and a processing device 130. The test platform 110 is used to dispose a correction block 111. The at least one depth sensing unit 120 is used to respectively capture first 3D coordinate information (a first point cloud) represented by a first viewing angle (or a first field of view) and second 3D coordinate information (a second point cloud) represented by a second viewing angle (or a second field of view) from the correction block 111. The processing device 130 is connected to the at least one depth sensing unit 120 and used to determine a first transformation relation $R_{12}$ of the first viewing angle versus the second viewing angle. In the first embodiment, the correction block 111 can be a non-symmetric 3D correction block with height gap to take image features captured by the at least one depth sensing unit 120 have characteristics of invariance, uniqueness, stability and independence for obtaining corresponding coordinate system relation. In another embodiment, the correction block 111 is a non-symmetric 3D correction block.

In the first embodiment, the processing device 130 respectively determines a first center coordinate of the first 3D coordinate information and a second center coordinate of the second 3D coordinate information. Because the image features have the characteristics of invariance, uniqueness, stability and independence, a feature matching method uses the above characteristics to calculate correlations of the images. If features captured from the left and right sides of the images are ambiguous or distorted, then spatial relations of the features are used for comparison. The spatial relations of the features (for example, spatial distance or spatial distribution) can be applied to construct corresponding relations of the image features. Hence the processing device 130 determines an initial space conversion relationship of the first center coordinate versus the second center coordinate according to an affine structure from motion according to the feature matching method and an affine structure from motion. The processing device 130 converts the first center coordinate to the second center coordinate according to the initial space conversion relationship. Then the processing device 130 transforms the first center coordinate into the second center coordinate such that the first 3D coordinate information is superimposed onto the second 3D coordinate information to form first overlap 3D coordinate information.

In the first embodiment, the processing device 130 sutures the first 3D coordinate information into the second 3D coordinate information to form a first 3D coordinate suturing result according to an iterative closet point (ICP) algorithm. Finally, the processing device 130 determines the first transformation relation $R_{12}$ according to the first 3D coordinate information and the first 3D coordinate suturing result.

In the first embodiment, before the processing device 130 performs the ICP algorithm, the processing device 130 increases weights of edge coordinate information of the first 3D coordinate information of the first overlap 3D coordinate information and increases weights of edge coordinate information of the second 3D coordinate information of the first overlap 3D coordinate information. In other words, the processing device 130 assigns higher weights to edge coordinate information and corner coordinate information of the first and second 3D coordinate information for enhancing accuracy of performing the ICP algorithm.

Because the image features have the characteristics of invariance, uniqueness, stability and independence, a feature matching method uses the above characteristics to calculate correlations of the images. If features captured from left and right side of the images have phenomenon of ambiguous or distorted, then spatial relations of the features are used for comparison. The spatial relations of the features (for example, spatial distance or spatial distribution) can be applied to construct corresponding relations of the image features.

In the first embodiment, after the processing device 130 obtains the first transformation relation $R_{12}$, a device under test 112 (not shown in FIG. 1) is disposed on the test platform 110. Then the at least one depth sensing unit 120 captures third 3D coordinate information represented by the first viewing angle and fourth 3D coordinate information represented by the second viewing angle from the device under test 112. The processing device 130 converts the third 3D coordinate information as first corrected 3D coordinate information represented by the second viewing angle according to the first transformation relation $R_{12}$. Finally, the processing device 130 superimposes the first corrected 3D coordinate information on the fourth 3D coordinate information as a device under test (DUT) 3D coordinate suturing result of the device under test 112.

Figure 2A:
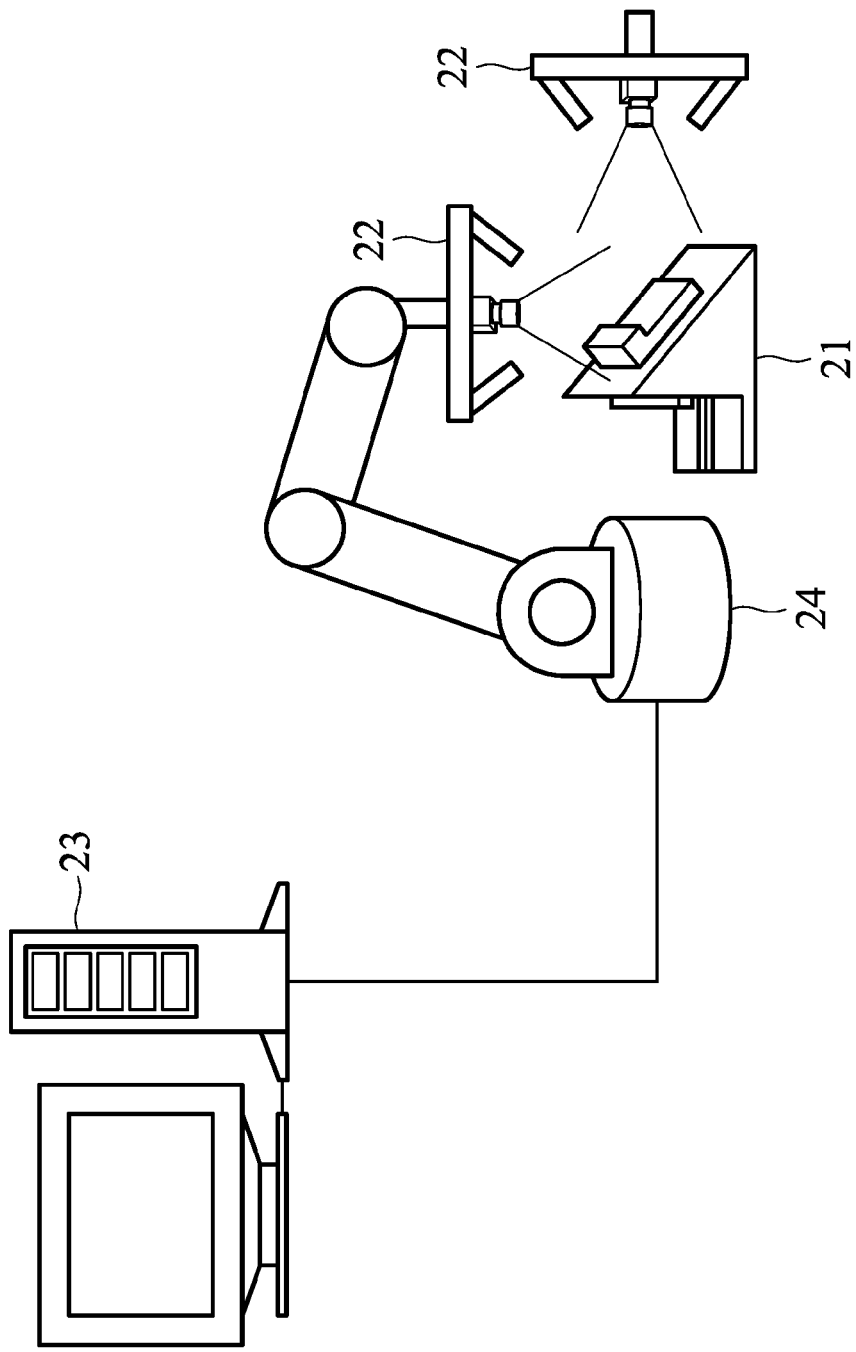
FIGS. 2A-2C shows an exemplary embodiment of the 3D coordinate information suturing device 10 according to a second embodiment of the present disclosure.
Figure 2C:
Figure 2B:
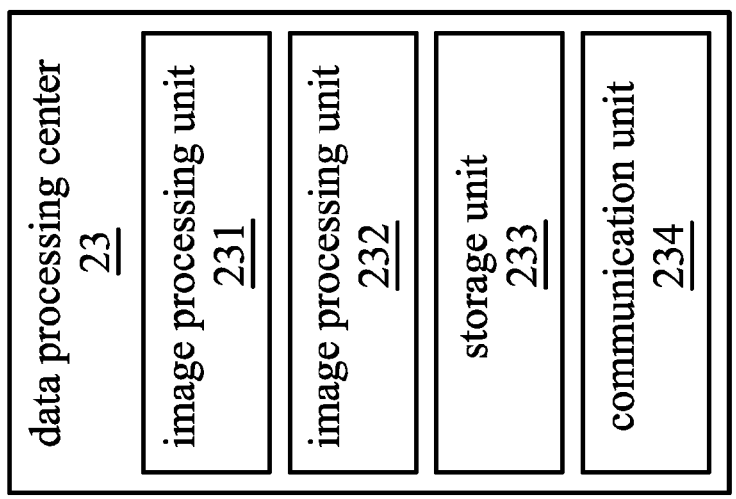

FIGS. 2A-2C shows an exemplary embodiment of the 3D coordinate information suturing device 10 according to a second embodiment of the present disclosure. In the second embodiment, the test platform 110, the at least one depth sensing unit 120, and the processing device 130 of the 3D coordinate information suturing device 10 are respectively corresponding to a correction block gauge 21, an image-taking device 22 and a data processing center 23. The data processing center 23 comprises an image processing unit 231, a display unit 232, a storage unit 223, and a communication unit 234. In the second embodiment, the 3D coordinate information suturing device 10 further comprises a moving device 24, wherein the moving device 24 is a robotic arm. The moving device 24 is respectively connected to the image-taking device 22 and the data processing center 23. In the second embodiment, the image-taking device 22 is installed on an end of the robotic arm (the moving device 24) and captures image information represented by different viewing angles (different fields of view) though moving the robotic arm from the correction block 111 or the device under test 112 disposed on the correction block gauge 21.

In the second embodiment, the image-taking device 22 comprises at least one illuminating unit 221 and at least one image capturing unit 222. The illuminating unit 221 is used to emit structure light on the correction block 111 or the device under test 112 disposed on the correction block gauge 21. The image capturing unit 222 is used to capture image information from the correction block 111 or the device under test 112, and transmit the image information to the storage unit 223 of the data processing center 23. The image processing unit 231 of the data processing center 23 analyzes the image information to obtain corresponding 3D coordinate information. In the second embodiment, the illuminating unit 221 can be implemented by a laser instrument, a lamp, a light-emitting diode, a halogen lamp, a fluorescent lamp, a spotlight or other light-emitting objects, and the image capturing unit 222 can be implemented by a charge-coupled device (CCD), a complementary metal-oxide semiconductor (CMOS), a rotating zoom camera or digital monitor, but the present disclosure is not limited thereto.

Figure 3A:
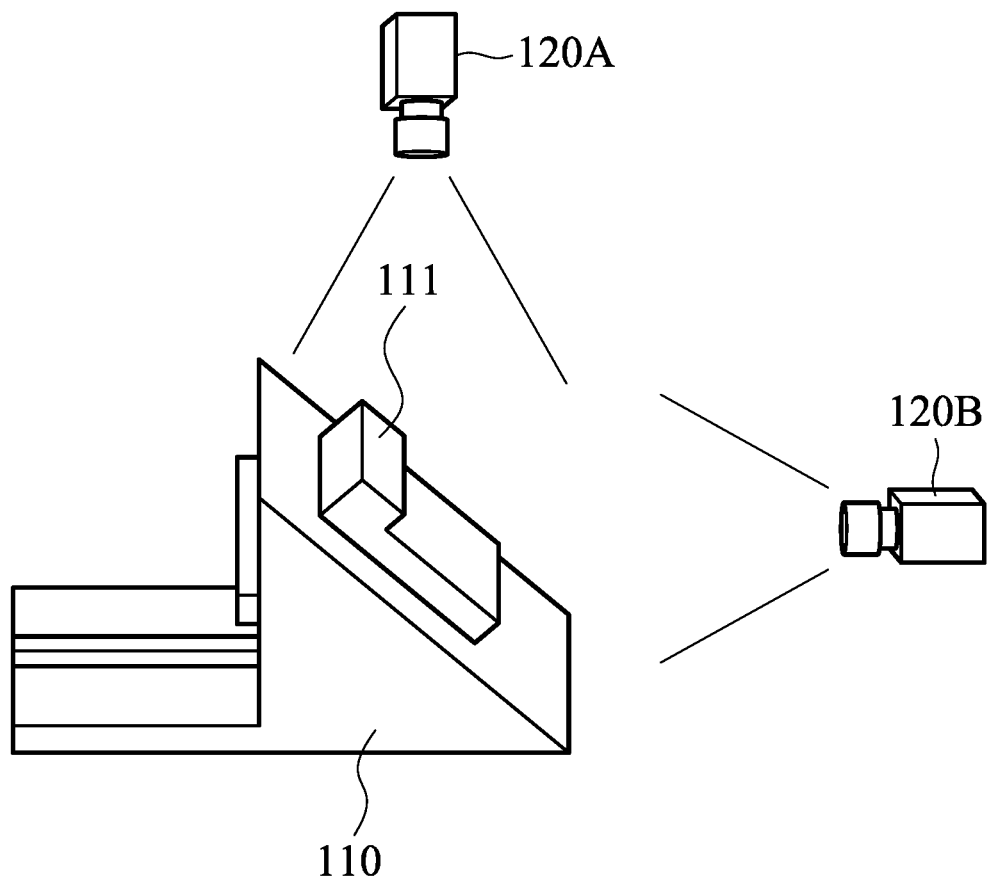
FIGS. 3A-3F illustrates the 3D coordinate information suturing device 10 how to determine a first transformation relation $R_{12}$ according to a third embodiment of the present disclosure.

FIGS. 3A-3F illustrates the 3D coordinate information suturing device 10 how to determine a first transformation relation $R_{12}$ according to a third embodiment of the present disclosure. In the third embodiment, FIG. 3A is a schematic diagram illustrates that a depth sensing unit 120A and a depth sensing unit 120B scan the correction block 111. In the third embodiment, the correction block 111 is an L-shaped correction block. But the present disclosure is not limited thereto; the correction block 111 can be a correction block having any non-symmetric shape.

In FIG. 3A, the correction block 111 is disposed on a 45 degree slope of the test platform 110, the depth sensing unit 120A is used to capture first 3D coordinate information of a first viewing angle under the first viewing angle/first field of view (capturing from just above the test platform 110) from the correction block 111, and the depth sensing unit 120B is used to capture second 3D coordinate information of a second viewing angle under the second viewing angle/second field of view (capturing from the right side of the test platform 110) from the correction block 111. The present disclosure is not limited thereto; the plane of the test platform 110 can be a slope of any degree. In the third embodiment, the depth sensing unit 120A and the depth sensing unit 120B can be any two sensing units 120 disposed under different viewing angles, and the depth sensing unit 120A and the depth sensing unit 120B also can be a schematic diagram illustrates the robotic arm (the moving device 24) respectively moves the image-taking device 22 to the first viewing angle and the second viewing angle.

Figure 3B:

FIG. 3B shows the first 3D coordinate information captured by the depth sensing unit 120A under the first viewing angle (capturing from just above the test platform 110). In FIG. 3B, under the first viewing angle, a disconnected region is located at middle of the first 3D coordinate information due to shield effect. It results in part of 3D coordinate information cannot be captured by the depth sensing unit 120A.

Figure 3C:
Figure 3D:
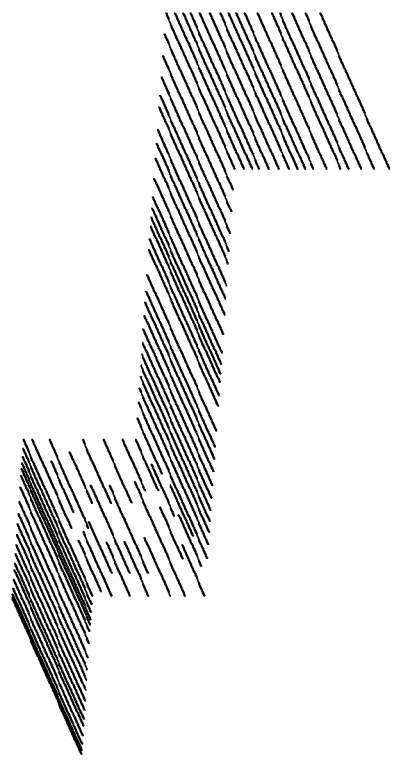
Figure 3D:

FIG. 3C shows the second 3D coordinate information captured by the depth sensing unit 120B under the second viewing angle (capturing from the right side of the test platform 110). In FIG. 3C, 3D coordinate information of the disconnected region of FIG. 3B can be captured under the second viewing angle (i.e. 3D coordinate information of shield region located at middle of the L-shaped correction block). But similarly, the second 3D coordinate information of the second viewing angle does not comprises 3D coordinate information located behind the L-shaped correction block.

FIG. 3D shows a schematic diagram of spatial position of the first 3D coordinate information of the first viewing angle and the second 3D coordinate information of the second viewing angle. FIG. 3D shows the 3D coordinate information captured by the depth sensing unit 120A is far away the 3D coordinate information captured by the depth sensing unit 120B.

Figure 3E:
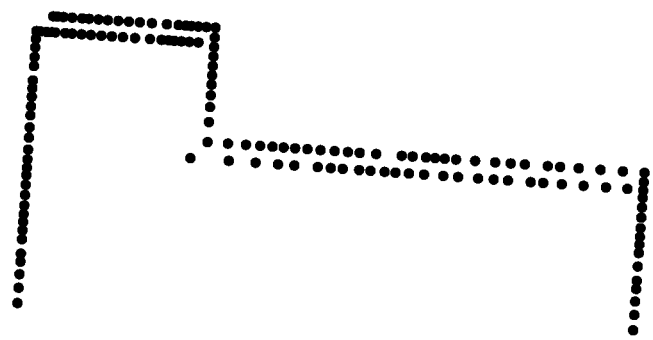

FIG. 3E shows a schematic diagram of the first overlap 3D coordinate information of the L-shaped correction block. In the third embodiment, the processing device 130 (data processing center 23) respectively determines a first center coordinate of the first 3D coordinate information shown in FIG. 3B and a second center coordinate of the second 3D coordinate information shown in FIG. 3C. Then the processing device 130 (data processing center 23) determines an initial space conversion relationship $R_{f1}$ of the first center coordinate versus the second center coordinate and converts the first center coordinate to the second center coordinate according to the initial space conversion relationship $R_{f1}$. Then the processing device 130 (data processing center 23) transforms the first center coordinate into the second center coordinate such that the first 3D coordinate information is superimposed onto the second 3D coordinate information to form the first overlap 3D coordinate information shown in FIG. 3E. In FIG. 3E, the converted first center coordinate of the first 3D coordinate information is superimposed to the second center coordinate of the second 3D coordinate information. In other words, the physical centers of gravity of the first and second 3D coordinate information are overlapped together.

Figure 3F:
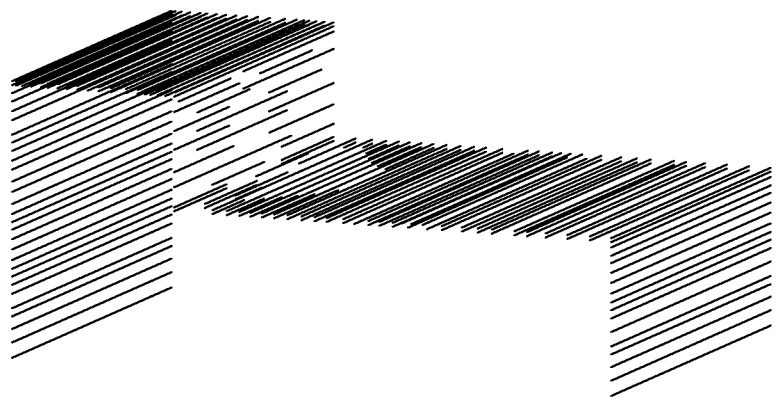

FIG. 3F shows a schematic diagram of the first 3D coordinate suturing result of the L-shaped correction block. Comparing with FIG. 3C, FIG. 3F shows more complete 3D coordinate information of the L-shaped correction block represented by the second viewing angle. In the third embodiment, the processing device 130 (data processing center 23) sutures the first 3D coordinate information of the first overlap 3D coordinate information shown in FIG. 3E into the second 3D coordinate information to form the first 3D coordinate suturing result shown in FIG. 3F in FIG. 3E according to an ICP algorithm.

In the third embodiment, in order to more accurately suture the first 3D coordinate information into the second 3D coordinate information, the processing device 130 (data processing center 23) increases weights of edge coordinate information and corners coordinate information of the second 3D coordinate information of the first overlap 3D coordinate information. In other words, the processing device 130 (data processing center 23) assigns higher weights to edge coordinate information and corners coordinate information of the first overlap 3D coordinate information for more accurately aligning edges of the L-shaped correction block. Accordingly, comparing with FIG. 3E, the first 3D coordinate suturing result more accurately sutures the first 3D coordinate information and the second 3D coordinate information. Finally, in the third embodiment, the processing device 130 (data processing center 23) obtains the first transformation relation $R_{12}$ of the first viewing angle versus the second viewing angle according to the original first 3D coordinate information and the first 3D coordinate suturing result shown in FIG. 3F.

In the third embodiment, the first viewing angle and the second viewing angle have an overlap common view area. However, it is notable that the center suturing method disclosed in the third embodiment also can be applied in the case of no overlap common view area (i.e. the depth sensing unit 120A and the depth sensing unit 120B would not capture 3D coordinate information of same portion of the L-shaped correction block or the first 3D coordinate information and the second 3D coordinate information are respectively corresponding to different portions of the L-shaped correction block). In addition, in the third embodiment, the first viewing angle and the second viewing angle are not limited to being 90 degrees (just above the test platform 110) and 0 degrees (the right side of the test platform 110), the first viewing angle and the second viewing angle only need to be different viewing angles.

In addition, in the third embodiment, the processing device 130 (data processing center 23) also can reversely performs the coordinate information overlap method shown in FIGS. 3E-3F to obtain a second 3D coordinate suturing result represented by the first viewing angle. Simultaneously, the processing device 130 (data processing center 23) obtains a second transformation relation $R_{21}$ of the second viewing angle versus the first viewing angle according to the original second 3D coordinate information and the second 3D coordinate suturing result.

A fourth embodiment of the present disclosure illustrates how does the 3D coordinate information suturing device 10 obtain a device under test (DUT) 3D coordinate suturing result of the device under test 112. For the sake of brevity, the 3D coordinate information suturing device 10 disclosed in the fourth embodiment still uses the 3D coordinate information suturing device 10 of the third embodiment. At this time, the processing device 130 (data processing center 23) has obtained the first transformation relation $R_{12}$ and the second transformation relation $R_{21}$ from the correction block 111, and the device under test 112 is already disposed on the test platform 110. Then the depth sensing unit 120A captures third 3D coordinate information of the first viewing angle from the device under test 112, and the depth sensing unit 120B captures fourth 3D coordinate information of the second viewing angle from the device under test 112.

In the fourth embodiment, before the processing device 130 (data processing center 23) obtains the DUT 3D coordinate suturing result of the device under test 112 represented by the second viewing angle, the processing device 130 (data processing center 23) converts the third 3D coordinate information represented by the first viewing angle into first corrected 3D coordinate information represented by the second viewing angle according to the first transformation relation $R_{12}$. Finally, the processing device 130 (data processing center 23) directly superimposes the first corrected 3D coordinate information into the fourth 3D coordinate information to obtain the DUT 3D coordinate suturing result of the device under test 112 represented by the second viewing angle.

In the fourth embodiment, before the processing device 130 (data processing center 23) obtains the DUT 3D coordinate suturing result of the device under test 112 represented by the first viewing angle, the processing device 130 (data processing center 23) converts the fourth 3D coordinate information represented by the second viewing angle into second corrected 3D coordinate information represented by the first viewing angle according to the first transformation relation $R_{12}$. Finally, the processing device 130 (data processing center 23) directly superimposes the second corrected 3D coordinate information into the third 3D coordinate information to obtain the DUT 3D coordinate suturing result of the device under test 112 represented by the first viewing angle.

Figure 4:
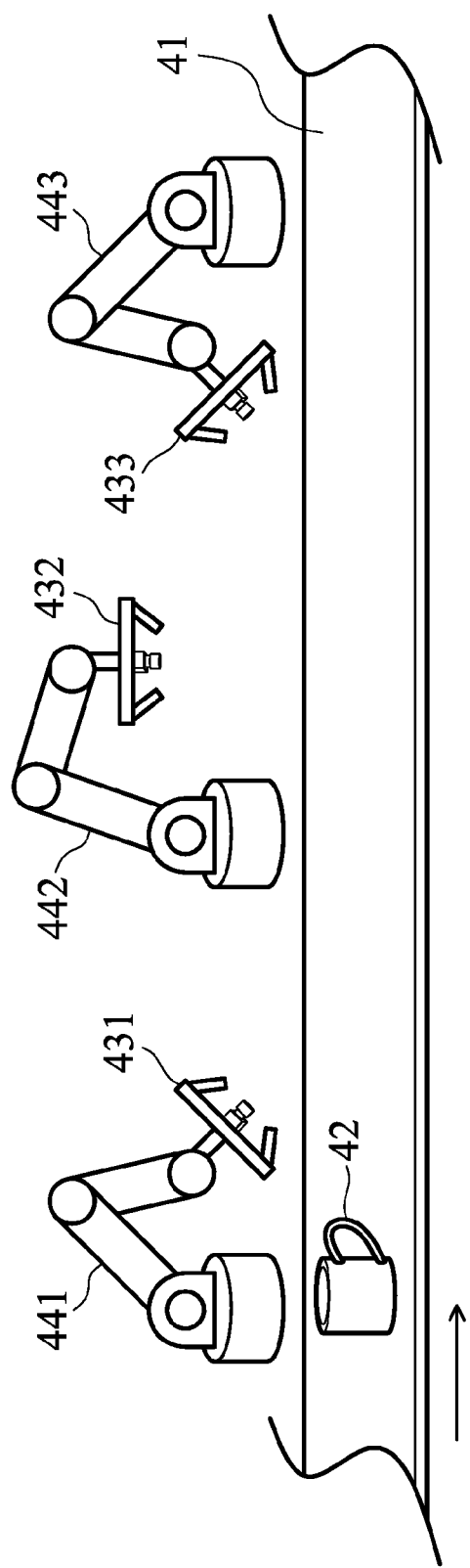
FIG. 4 shows an exemplary embodiment of the 3D coordinate information suturing device 10 according to a fifth embodiment of the present disclosure.

FIG. 4 shows an exemplary embodiment of the 3D coordinate information suturing device 10 according to a fifth embodiment of the present disclosure. In the fifth embodiment, the 3D coordinate information suturing device 10 is applied to a detection system 40. The detection system 40 is used to capture 3D coordinate suturing result of each of device under tests 42 moved on a flow line track 41 of the detection system 40. As shown in FIG. 4, a depth sensing unit 431 with a first viewing angle and a depth sensing unit 432 with a second viewing angle are respectively installed on an end of a robotic arm 441 and an end of a robotic arm 442, wherein the robotic arm 441 and the robotic arm 442 are erected beside the flow line track 41. In the fifth embodiment, the depth sensing unit 431 and the depth sensing unit 432 has already obtained the first transformation relation $R_{12}$ of converting the first viewing angle into the second viewing angle and the second transformation relation $R_{21}$ of converting the second viewing angle into the first viewing angle from the correction block 111. The depth sensing unit 431 is used to capture third 3D coordinate information represented by the first viewing angle from the device under test 42 passed through viewing angle range of the depth sensing unit 431. The depth sensing unit 432 is used to capture fourth 3D coordinate information represented by the second viewing angle from the device under test 42 passed through the viewing angle range of the depth sensing unit 432. Similarly, through the 3D coordinate information suturing method disclosed in the fourth embodiment, the detection system 40 obtains two device under test (DUT) 3D coordinate suturing results of the device under test 42 respectively represented by the first viewing angle and the second viewing angle.

In another embodiment, the detection system 40 can further have a robotic arm 443 and a depth sensing unit 433 with a third viewing angle installed on an end of the robotic arm 443, wherein the robotic arm 443 is erected beside the flow line track 41. Then the detection system 40 obtains a third transformation relation $R_{31}$ of converting the first viewing angle into the third viewing angle, and uses the third transformation relation $R_{31}$ to convert the third 3D coordinate information of the first viewing angle into corrected 3D coordinate information represented by the third angle. Simultaneously, the detection system 40 also obtains a fourth transformation relation $R_{32}$ of converting the second viewing angle into the third viewing angle, and uses the fourth transformation relation $R_{32}$ to convert the third 3D coordinate information of the second viewing angle into corrected 3D coordinate information represented by the third angle. Similarly, through the 3D coordinate information suturing method disclosed in the fourth embodiment, the detection system 40 obtains the DUT 3D coordinate suturing result of the device under test 42 represented by the third viewing angle.

Figure 5A:
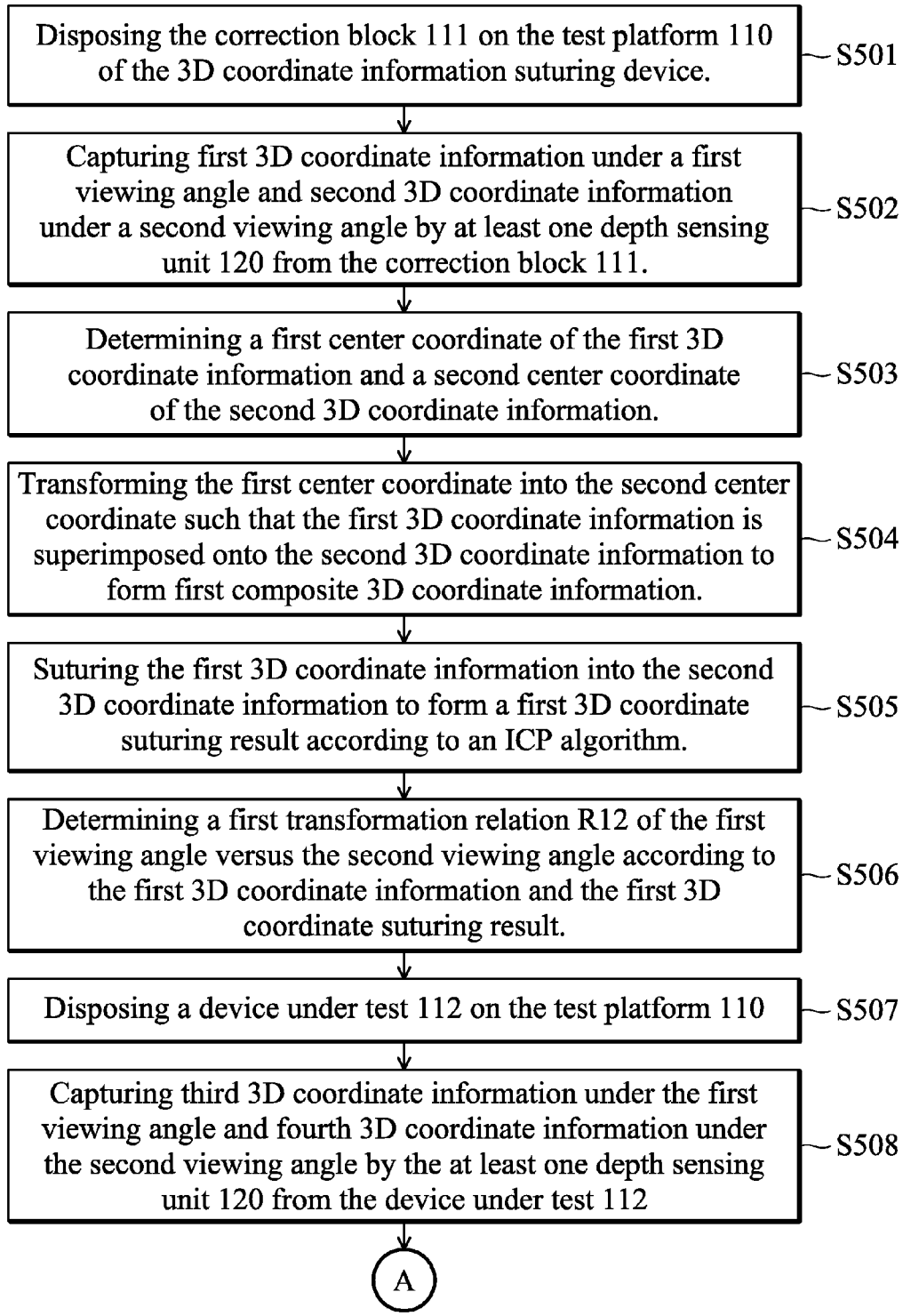
FIG. 5A-5B shows a flow diagram of a 3D coordinate information suturing method according to a sixth embodiment of the present disclosure.
Figure 5B:
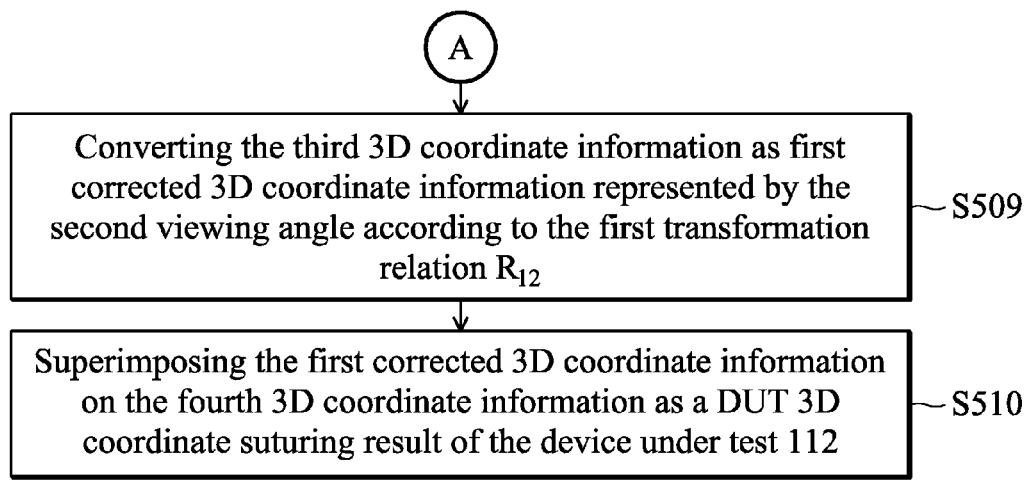

FIG. 5A-5B shows a flow diagram of a 3D coordinate information suturing method according to a sixth embodiment of the present disclosure. In step S501, disposing the correction block 111 on the test platform 110 of the 3D coordinate information suturing device 10. In step S502, capturing first 3D coordinate information represented by a first viewing angle and second 3D coordinate information represented by a second viewing angle by at least one depth sensing unit 120 from the correction block 111. In step S503, determining a first center coordinate of the first 3D coordinate information and a second center coordinate of the second 3D coordinate information. In step S504, transforming the first center coordinate into the second center coordinate such that the first 3D coordinate information is superimposed onto the second 3D coordinate information to form first overlap 3D coordinate information. In step S505, suturing the first 3D coordinate information into the second 3D coordinate information to form a first 3D coordinate suturing result according to an ICP algorithm. In step S506, determining a first transformation relation $R_{12}$ of the first viewing angle versus the second viewing angle according to the first 3D coordinate information and the first 3D coordinate suturing result.

Then, in step S507, disposing a device under test 112 on the test platform 110. In step S508, capturing third 3D coordinate information represented by the first viewing angle and fourth 3D coordinate information represented by the second viewing angle by the at least one depth sensing unit 120 from the device under test 112. In step S509, converting the third 3D coordinate information as first corrected 3D coordinate information represented by the second viewing angle according to the first transformation relation $R_{12}$. Finally, in step S510, superimposing the first corrected 3D coordinate information on the fourth 3D coordinate information as a device under test (DUT) 3D coordinate suturing result of the device under test 112

In summary, although the present disclosure is disclosed in each of the above embodiments, the present disclosure is not limited thereto. The following description is of the best-contemplated mode of carrying out the present disclosure. This description is made for the purpose of illustrating the general principles of the present disclosure and should not be taken in a limiting sense. Those skilled in the art should also realize that such equivalent constructions do not depart from the spirit and scope of the present disclosure, and that they may make various changes, substitutions, and alterations herein without departing from the spirit and scope of the present disclosure. Therefore the scope of the present disclosure is best determined by reference to the claims appended below.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally to be construed to mean "one or more" unless specified otherwise or it is clear from context that they are to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

What is claimed is:

1. A three-dimensional (3D) coordinate information suturing method for applying on a 3D coordinate information suturing device, the 3D coordinate information suturing method comprising:
    disposing a correction block on a test platform of the 3D coordinate information suturing device;
    capturing first 3D coordinate information represented by a first viewing angle and second 3D coordinate information represented by a second viewing angle by at least one depth sensing unit from the correction block;
    determining a first center coordinate of the first 3D coordinate information and a second center coordinate of the second 3D coordinate information;
    transforming the first center coordinate into the second center coordinate such that the first 3D coordinate information is superimposed onto the second 3D coordinate information to form first overlap 3D coordinate information;
    suturing the first 3D coordinate information into the second 3D coordinate information to form a first 3D coordinate suturing result according to an iterative closet point algorithm; and
    determining a first transformation relation of the first viewing angle versus the second viewing angle according to the first 3D coordinate information and the first 3D coordinate suturing result.

2. The 3D coordinate information suturing method as claimed in claim 1, wherein before performing the iterative closet point algorithm, the 3D coordinate information suturing method further comprising:
    increasing weights of edge coordinate information of the first 3D coordinate information of the first overlap 3D coordinate information; and
    increasing weights of edge coordinate information of the second 3D coordinate information of the first overlap 3D coordinate information.

3. The 3D coordinate information suturing method as claimed in claim 1, further comprising:
    capturing third 3D coordinate information represented by the first viewing angle and fourth 3D coordinate information represented by the second viewing angle by the at least one depth sensing unit from a device under test disposed on the test platform; and
    suturing the third 3D coordinate information into the fourth 3D coordinate information to form a DUT 3D coordinate suturing result of the device under test by the first transformation relation.

4. The 3D coordinate information suturing method as claimed in claim 1, wherein forming the first overlap 3D coordinate information further comprising:
    determining an initial space conversion relationship of the first center coordinate versus the second center coordinate according to an affine structure from motion; and
    converting the first center coordinate to the second center coordinate according to the initial space conversion relationship.

5. The 3D coordinate information suturing method as claimed in claim 3, wherein before performing the iterative closet point algorithm, the 3D coordinate information suturing method further comprising:
    increasing weights of edge coordinate information of the first 3D coordinate information of the first overlap 3D coordinate information; and
    increasing weights of edge coordinate information of the second 3D coordinate information of the first overlap 3D coordinate information.

6. The 3D coordinate information suturing method as claimed in claim 3, wherein forming the DUT 3D coordinate suturing result further comprises:
    converting the third 3D coordinate information as first corrected 3D coordinate information according to the first transformation relation; and
    superimposing the first corrected 3D coordinate information on the fourth 3D coordinate information as the DUT 3D coordinate suturing result.

7. The 3D coordinate information suturing method as claimed in claim 1, wherein the correction block is a non-symmetric 3D correction block.

8. A three-dimensional (3D) coordinate information suturing device, comprising:
    a test platform, used to dispose a correction block;
    at least one depth sensing unit, used for respectively capturing first 3D coordinate information represented by a first viewing angle and second 3D coordinate information represented by a second viewing angle from the correction block;
    a processing device, connected to the at least one depth sensing unit, used to determine a first transformation relation of the first viewing angle versus the second viewing angle, wherein the processing device determines a first center coordinate of the first 3D coordinate information and a second center coordinate of the second 3D coordinate information;
    wherein the processing device transforms the first center coordinate into the second center coordinate such that the first 3D coordinate information is superimposed onto the second 3D coordinate information to form first overlap 3D coordinate information;
    wherein the processing device sutures the first 3D coordinate information into the second 3D coordinate information to form a first 3D coordinate suturing result according to an iterative closet point algorithm; and
    wherein the processing device determines the first transformation relation according to the first 3D coordinate information and the first 3D coordinate suturing result.

9. The 3D coordinate information suturing device as claimed in claim 8, wherein before the processing device performs the iterative closet point algorithm, the processing device further increases weights of edge coordinate information of the first 3D coordinate information of the first overlap 3D coordinate information and increases weights of edge coordinate information of the second 3D coordinate information of the first overlap 3D coordinate information.

10. The 3D coordinate information suturing device as claimed in claim 8, wherein the processing device further captures third 3D coordinate information represented by the first viewing angle and fourth 3D coordinate information represented by the second viewing angle by the at least one depth sensing unit from a device under test disposed on the test platform; and
    wherein the processing device sutures the third 3D coordinate information into the fourth 3D coordinate information to form a DUT 3D coordinate suturing result of the device under test by the first transformation relation.

11. The 3D coordinate information suturing device as claimed in claim 8, wherein the processing device forms the first overlap 3D coordinate information further comprising:
    the processing device determines an initial space conversion relationship of the first center coordinate versus the second center coordinate according to an affine structure from motion; and the processing device converts the first center coordinate to the second center coordinate according to the initial space conversion relationship.

12. The 3D coordinate information suturing device as claimed in claim 10, wherein before the processing device performs the iterative closet point algorithm, the processing device further increases weights of edge coordinate information of the first 3D coordinate information of the first overlap 3D coordinate information and increases weights of edge coordinate information of the second 3D coordinate information of the first overlap 3D coordinate information.

13. The 3D coordinate information suturing device as claimed in claim 10, wherein the processing device forms the DUT 3D coordinate suturing result further comprising:

the processing device converts the third 3D coordinate information as first corrected 3D coordinate information according to the first transformation relation; and the processing device superimposes the first corrected 3D coordinate information on the fourth 3D coordinate information as the DUT 3D coordinate suturing result.

14. The 3D coordinate information suturing device as claimed in claim 8, wherein the correction block is a non-symmetric 3D correction block.

* * * * *